Patented Nov. 19, 1935

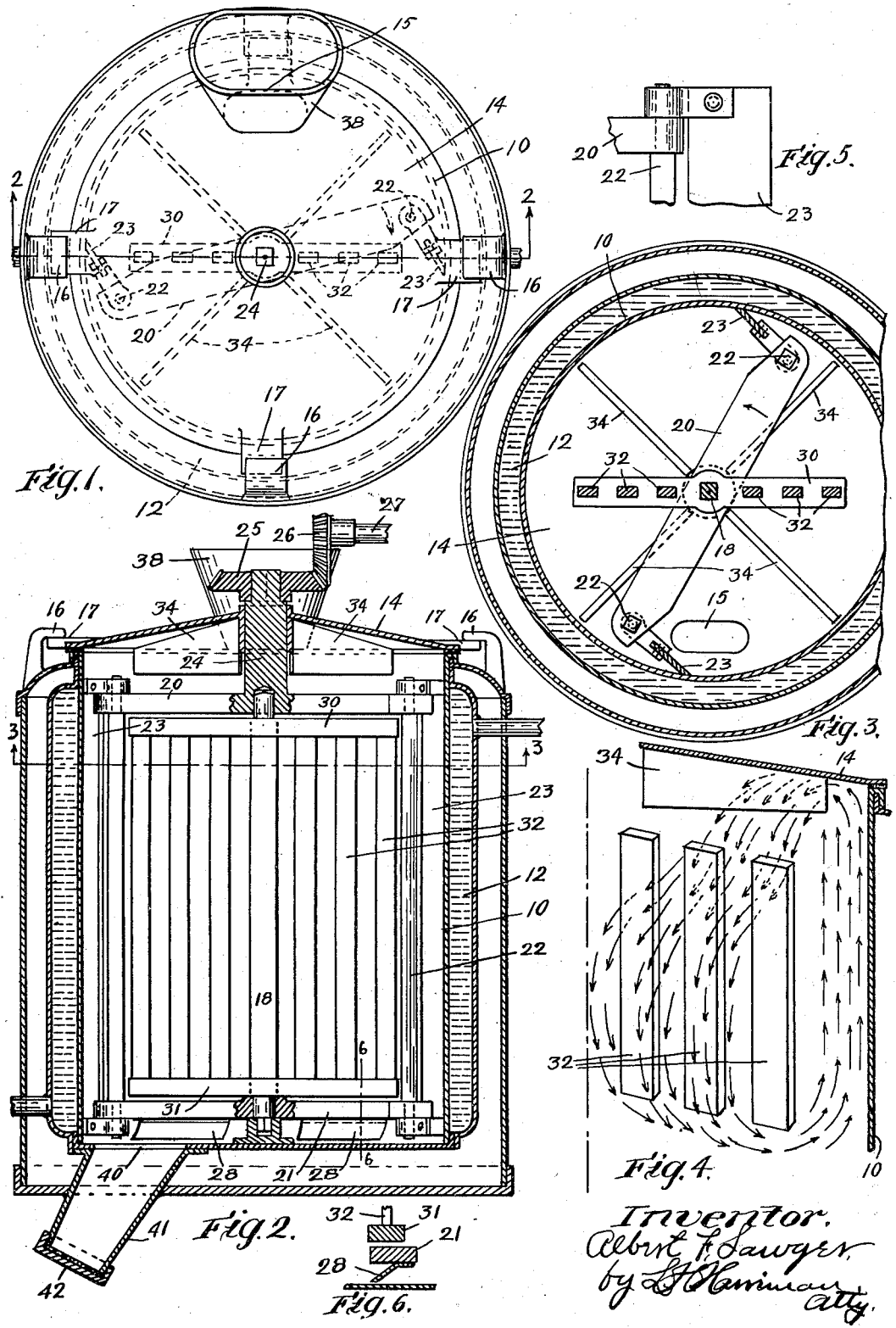

2,021,153

UNITED STATES PATENT OFFICE 2,021,153

ICE CREAM FREEZER

Albert F. Sawyer, Haverhill, Mass., assignor to Irving L. Keith, Haverhill, Mass.

Application October 19, 1934, Serial No. 749,080

15 Claims. (Cl. 259—99)

This invention relates to ice cream freezers of the common type in which a rotary stirrer is mounted within a cylindrical container, said stirrer having oppositely disposed blades which are pivotally mounted on a frame and have one edge portion arranged to engage the wall of the container while held in an oblique position relative thereto, with the wall engaging edge in advance of the frame, so that, as the stirrer is rotated, the liquid in the container is scraped from the inner surface of the container and is deflected towards the middle thereof.

More particularly this invention relates to a type of ice cream freezer which is more generally used for commercial purpose, and in which the cylindrical wall of the container is refrigerated by the circulation of a refrigerant through a chamber or coil surrounding the same, so that the container must be fixed, and in which the stirrer is driven by a motor.

As, under these conditions, there is no rotary movement of the container in opposition to the rotation of the stirrer, as is the common practice when ice and salt are employed as a freezing means, the stirrer tends strongly to cause a corresponding circular motion of the entire contents of the container, resembling a whirlpool with a vortex in the middle, this tendency being greatly increased with increased speed of the stirrer, so that the whirling motion of the contents is very marked when the stirrer is driven at a high speed.

In freezing ice cream, one of the purposes of the stirring action is to aerate the contents of the container very thoroughly, thereby greatly increasing its volume, and also, where fruit has been placed in the container with the cream, to disintegrate the fruit and thoroughly mix it with the entire contents.

These purposes are to a large extent frustrated by the whirling motion of the contents caused by the stirrer when the container is held stationary, as the contents is likely to become frozen in a solid mass without being either suitably aerated or the solid matter disintegrated.

When the container is held in a vertical position, which for various reasons is advantageous over a horizontal position, and is only partly filled with the mixture to be frozen, as is necessary to provide room to permit expansion when it is aerated, the mixture, which is in a freely liquid state when first placed in the container, will not only be thrown inwardly by the stirrer blades, but will also be forced upwardly against the cover thereby, particularly when the stirrer is power driven at a much higher speed than that at which it could be driven by hand, with the result that the mixture tends to collect above the path of movement of the stirrer, so that a portion of the mixture is not circulated and the freezing action throughout the same is not uniform.

In the production of ice cream for commercial purposes, where an electric motor is employed to drive the stirrer, the power required is an important item of cost, and a type of freezer which enables a substantial saving to be made in the cost of power is obviously advantageous.

The objects of my invention are to provide means whereby the whirling motion of the contents of the container within the path of movement of the stirrer blades is not only arrested, but will be made to have an aerating effect thereon and will also act to cause disintegration of solid portions which may be mixed therewith, also to provide means for preventing accumulation of the contents in the top portion of the container, which will act to increase both the aerating effect and the circulating action, so that the liquid which is forced to the top of the container will be directed in a cascade towards the middle thereof and directed inwardly and downwardly at the middle so that the entire contents will be frozen uniformly.

Another object is to provide an ice cream freezer for commercial purposes which is arranged to be driven by an electric motor and which may be operated by the use of substantially less electric power than the amount required by other commercial freezers, other factors being equal.

I accomplish these objects by providing in connection with a fixed container having a power driven stirrer of the type above referred to, a series of fixed bars which extend in parallelism with the stirrer blades within the path of movement thereof and are arranged in a row extending diametrically of the container and are suitably spaced apart, so that both the liquid and the solids, such as pieces of fruit, may pass therebetween, and which are arranged to act in conjunction with radially disposed plates, which are arranged above the stirrer blades and direct the upward flow caused thereby inwardly against said row of blades in a cascade, so that the liquid is conducted towards the middle of the container and thence downward therein, whereby the liquid is circulated and, at the same time aerated, so that the entire contents of the container will be frozen uniformly and rapidly aerated.

For a more complete disclosure of the invention, reference is now made to the following specification, in connection with the accompanying drawing in which:

Fig. 1 is a plan view of an ice cream freezer embodying my invention.

Fig. 2 is a sectional view at line 2—2 of Fig. 1.

Fig. 3 is a sectional view at line 3—3 of Fig. 2.

Fig. 4 is a detail view illustrating a portion of the circulating action.

Fig. 5 is a detail view of a portion of the stirrer.

Fig. 6 is a detail view at line 6—6 of Fig. 2.

As shown in the drawing, the freezer comprises a fixed, vertically disposed container 10 having a cylindrical side wall and horizontal bottom, said side wall being enclosed by a refrigerating expansion chamber 12 through which a refrigerant is circulated by suitable means, so that the temperature of said side wall may be reduced to the desired extent. Said container is provided with a top closure, or cover 14, having a filling opening 15, suitable means being provided for tightly clamping the cover onto the container, the means shown consisting of recessed lugs 16 on the container having cam faces arranged for engagement with corresponding projections 17 on the cover by a slight rotary movement of the latter.

A post 18 having a square lower end, is arranged to be set into a square socket in the middle of the bottom of the container, so that it will be held against rotation in a vertical position, and a stirrer is rotatably mounted on said post, said stirrer comprising an oblong rectangularly shaped frame consisting of top and bottom cross bars 20, 21 which are connected by pivot rods 22 in the ends thereof, said cross bars being rotatably mounted on the post 18, and the rods 22 having stirrer blades 23 mounted thereon, and so arranged that one longitudinal edge thereof will swing into engagement with the side of the container, in which position the blades will be obliquely to the side, as shown in Fig. 3. Said blades are preferably formed of thin, slightly resilient sheet steel, each having a sharp edge which is engaged with the container wall, so that, as they are rotated, they will be effective in removing the contents of the container which tends to become frozen to its inner side wall. The top bar 20 has a shaft 24 rigidly connected thereto and extended through a central opening in the cover 14, any suitable means being provided for driving said shaft, as the bevel gears 25 and 26 and the power driven shaft 27, indicated in Fig. 2.

As thus arranged the stirrer will be rotated about a central vertical axis in the direction of the arrows of Fig. 1.

The bottom bar 21 of the stirrer frame is provided with blades 28 on the under sides thereof which extend downwardly and obliquely forward, with relation to the direction of rotation, so that their lower edges are carried in close proximity to the bottom of the container and act to prevent accumulation of the contents of the container at the bottom and assist in the circulatory action hereinafter described.

I further provide a fixed grid within the path of movement of the side rods 22 of the stirrer frame which consists of horizontal top and bottom bars 30 and 31 and a series of vertical, suitably spaced, intercepting and deflecting bars 32, which are rigidly mounted at their ends on bars 30, 31, the latter having square holes at the middle thereof, which are fitted to square portions on the fixed central post 18 and are held in close proximity to the top and bottom bars 20, 21 of the stirrer frame. The bars 32 have flat sides and square corners, and are arranged in a row which extends diametrically of the container, with an equal number of bars at each side of the central post. The width of the spaces between said bars 32 is preferably uniform and is preferably approximately the same as the distance from the outermost thereof to the path of movement of the side rods 22 of the stirrer and from the innermost, thereof to the central post 18, as shown in Fig. 2. This distance in practice, is important within certain limits, and has been determined by experience, as will be explained. Also the exact number of bars 32, which will be employed, will depend largely on the diameter of the container, three at each side of the central post being shown.

The cover 14 is provided on its under side with a series of radially disposed fins 34 which depend vertically from its under side and extend from the side wall of the container nearly to the post 18, with their bottom edges horizontal and disposed in close proximity to the path of movement of the top bar 20 of the stirrer and the top end of its blades 23. The number of said fins 34 may be varied, but the aerating and circulating action will be facilitated by employing at least two and preferably four of said fins, spaced at 90° apart, as shown in Figs. 1 and 3, two of which are arranged in approximately definite relation to the position of the grid bars 32, being located at a short distance in advance thereof, with reference to the direction of rotation of the stirrer, as shown in Fig. 3.

The filling opening 15 of the cover is provided with a funnel shaped entrance passage 38, and, as this opening is never closed in practice, it is located at some point which is in advance or in the rear of the fixed grid, as shown in Fig. 1, so that, during the freezing operation, the contents will not pile up and be forced out through the opening. The bottom of the container is also provided with a discharge opening 40 from which a short tube 41 leads, the bottom end of which is closed by a valve 42. In practice this valve is occasionally opened and the contents of the tube 41 is drained off and poured back into the container, and when the freezing operation is finished the entire contents is removed by opening this valve while the stirrer is still being rotated, so that the discharge is facilitated, the blades 28 acting to sweep the portion which might otherwise remain in the bottom, into the discharge opening.

In practice at the beginning of the freezing operation the container will not be more than half filled with the mixture to be frozen, as the aerating and freezing action increases its volume fully 100%. The stirrer will be driven rapidly and the action thereof tends to force the contents both inwardly and upwardly and to cause a whirling motion of the entire contents. As the contents is forced inwardly and circularly, the circular movement is partly intercepted by the bars 32, so that it flows between them and also they act to direct the flow inwardly, thus thoroughly breaking up the whirling motion which would otherwise take place. As previously stated the corners of the bars 32 are square and thus provide sharp edges, as compared with a rounded edge, and these act to disintegrate solid matter, such as strawberries and pieces of fruit, so that it becomes thoroughly mixed with the liquid.

The constant flow between the bars 32 also breaks up frozen flakes of the mixture at the more advanced stages of the operation, so that the consistency of the entire mass is kept constant. At the beginning of the operation the central vortex is large so that the flow is principally between the outermost bars 32, but as the aerating process continues and the mass swells, the vortex grows smaller so that the flow is finally between all the bars and the middle post 18.

At the same time a considerable portion of the liquid is forced upward above the top ends of the blades into contact with the depending fins 34, and the whirling motion causes the liquid to be dammed up against them and then to be directed inward. With the construction shown, in the early stages of the operation when the contents is freely liquid four jets or streams are directed inward, against the central post 18. As the liquid thickens and becomes less freely liquid, these streams develop into a cascade which is directed obliquely inward from two of the fins against the adjacent bars 32 which in turn deflect the portion which does not pass between them inwardly to the middle. The flow is then downward at the middle, then outward at the bottom and then upward at the side wall, as somewhat indicated by the arrows in Fig. 2.

The above described action causes a rapid aeration of the liquid, so that, by the time the freezing operation has been sufficiently advanced, it will have become aerated to the full extent desired, also, at the same time, the freezing operation will be uniformly advanced throughout the entire mass, so that it will be perfectly smooth and without lumps, and all fruit, or other solid matter placed therein will be thoroughly disintegrated and mixed with the liquid uniformly, the entire operation being rapidly performed. Also on account of the fact that the freezer has only one moving part, viz: the stirrer, which is driven, the power required for operation is greatly reduced, as compared with the power required for a freezer of like capacity having both an inner and an outer stirrer which are driven in opposite directions, or a freezer in which the container is rotated in the opposite direction to an outer stirrer.

In practice the freezing operation is discontinued while the mixture is still in a semi-liquid state, so that it may be readily discharged thru the outlet at the bottom, the discharging operation being greatly facilitated by the blades 28, which sweep the contents into the discharge outlet.

While the type of grid shown is considered preferable to a grid formed from a coarse wire screen, or to any other type of grid, of which I am aware, yet satisfactory results may be secured with various other types of grids, which would operate in substantially the manner above described.

While the operation and construction has been described in connection with a freezer of the vertical type, which type has many advantages over the horizontal type of freezer, it may be noted that the above described construction may be advantageously employed when operated in other positions than that shown.

I claim:

1. In combination with a fixed cylindrical container having means for externally refrigerating the cylindrical wall thereof, a stirrer mounted to rotate within said container about the axial line thereof and comprising an open frame having end and side portions and blades on said side portions extending obliquely therefrom to the cylindrical wall of the container, a plurality of intercepting plates stationarily mounted at opposite sides of said axial line within the opening of said frame in spaced apart relation and arranged in a row extending diametrically of the container between points adjacent and out of contact with diametrically opposite points in the path of movement of said blades, and means for rotating said frame about said plates.

2. In combination with a fixed cylindrical container, means for externally refrigerating the cylindrical wall thereof, a stirrer comprising a frame mounted to rotate within the container about the axial line thereof and having blades on its side portions arranged to extend obliquely therefrom to said wall, a grid stationarily supported within the opening of said frame in an axial plane of the container and extending longitudinally and transversely for approximately the length and diameter of the path of movement of said frame and providing throughout the area thereof a multiplicity of openings for the passage of the material in the container and means for rotating said frame about said grid.

3. In combination with a fixed cylindrical container, means for externally refrigerating the cylindrical wall thereof, a stirrer comprising an open frame mounted to rotate within the container about the axial line thereof and having blades on its side portions arranged to extend obliquely therefrom to said wall, a grid stationarily mounted within said frame opening and extending longitudinally and transversely for nearly the length and width of the path of movement thereof and in an axial plane of the container, said grid comprising a plurality of longitudinally extending bars at both sides of said axial line and spaced apart transversely thereof to provide openings for the passage of the material in the container therebetween, and means for rotating said frame about said grid.

4. In combination with a fixed cylindrical container, means for externally refrigerating the cylindrical wall thereof, a stirrer comprising an open frame mounted to rotate within the container about the axial line thereof and having blades on its side portions arranged to extend obliquely therefrom to said wall, a grid stationarily mounted within said frame opening and in an axial plane of said container and comprising a plurality of flat sided, longitudinally extending bars at both sides of said axial line spaced apart laterally to provide elongated openings therebetween for the passage of the material in the container, and means for rotating said frame about said grid.

5. In combination with a fixed cylindrical container, means for externally refrigerating the cylindrical wall thereof, a stirrer comprising an open frame mounted to rotate within the container about the axial line thereof and having blades on its side portions arranged to extend obliquely therefrom to said wall, a grid stationarily mounted within said frame opening and comprising a plurality of flat sided, and square cornered bars arranged at both sides of said axial line with their flat sides in parallelism with an axial plane of the container, and extending longitudinally thereof in spaced apart relation to provide openings for the passage of material in the container and means for rotating said frame about said grid.

6. In combination with a fixed cylindrical container, means for externally refrigerating the cylindrical wall thereof, a stirrer comprising a frame mounted to rotate within the container about the axial line thereof and having blades on its side portions arranged to extend obliquely therefrom to said wall, said frame portions providing a rectangularly shaped open space therebetween, a rectangularly shaped grid stationarily disposed within the open space of said frame the dimensions thereof being similar to, but substantially less than the dimensions of said space, and said grid comprising a plurality of bars extending longitudinally of the container in spaced apart relation, and means for rotating said frame about said grid, to provide a multiplicity of openings for the passage of the material in the container adjacent and within the path of movement of the blades.

7. In combination with a fixed cylindrical, vertically disposed container having a top closure and means for externally refrigerating the cylindrical wall thereof, a stirrer mounted therein to rotate about a central vertical axis and having vertically and obliquely disposed, relatively narrow blades having their front edges arranged for engagement with said cylindrical wall and providing a space of substantially greater width than that of said blades within their path of movement for inward and downward circulation, means to rotate said stirrer to propel the liquid in the container inwardly, circularly and upwardly above the top ends of said blades and one or more baffle plates depending from said top closure and extending from said cylindrical wall above and in proximity to the path of movement of the top ends of said blades and for a substantial distance within said path towards the middle of the container, to deflect liquid forced above said blades towards the middle of the container.

8. In combination with a cylindrical, vertically disposed, refrigerated container, a stirrer mounted therein to rotate about a central vertical axis and having longitudinally extending blades arranged to be carried with one edge in contact with the side of the container, means for rotating said stirrer to carry said blades in a direction to propel the liquid contents of the container inwardly and upwardly therein, an elongated, vertically extending deflector plate fixed within the container adjacent and within the path of movement of said blades and extending transversely towards the middle of the container for a portion of the distance from said path, and a top closure on said container having a radially disposed fin on its inner side depending into proximity to the top end of said path of movement and adjacent and in advance of said fixed deflector plate, to deflect the liquid forced above the blades inwardly against said deflector plate and toward the middle of the container.

9. In combination with a fixed cylindrical, vertically disposed, refrigerated container, a stirrer mounted therein to rotate about a central vertical axis and having longitudinally extending blades arranged to be carried with one edge in contact with the side of the container, means for rotating said stirrer to carry said blades in a direction to propel the liquid contents of the container inwardly and circularly therein, and a grid fixed within the path of movement of said blades and comprising a plurality of elongated, vertically extending, flat sided bars at each side of said axis spaced apart and arranged in a row extending diametrically of the container between opposite points adjacent said path, to provide a multiplicity of openings for the passage of said contents between said bars.

10. In combination with a cylindrical, vertically disposed, refrigerated container, a stirrer mounted therein to rotate about a central vertical axis and having longitudinally extending blades arranged to be carried with one edge in contact with the side of the container, means for rotating said stirrer to carry said blades in a direction to propel the liquid contents of the container inwardly and upwardly therein, and a grid fixed within the path of movement of said blades and comprising a plurality of elongated, vertically extending, flat sided bars spaced apart and arranged in a row extending diametrically of the container between opposite points adjacent said path, said container having a top closure provided with a pair of depending fins extending radially from the side walls of the container above and adjacent the path of movement of the blades and in advance of said grid, to deflect liquid forced above said blades inwardly against said grid.

11. In combination with a fixed cylindrical container having a refrigerated side wall, a stirrer mounted to rotate therein about a central longitudinal axis and having a pair of oppositely disposed blades extending obliquely to said wall and providing an open space therebetween, whereby the material in the container is propelled inwardly and circularly thereof, and an intercepting grid mounted within the path of movement of said blades and held against movement in the direction of rotation thereof, said grid extending longitudinally for a substantial portion of the length of the blades and transversely radially of the container from the axis to points adjacent to, and out of contact with said path, said grid being provided with a multiplicity of openings between said axis and said path for the passage of the material as it is propelled circularly.

12. In combination with a fixed cylindrical container having a refrigerated side wall, a stirrer mounted to rotate therein about a central longitudinal axis and having a pair of oppositely disposed blades extending obliquely to said wall and providing an open space therebetween, whereby the material in the container is propelled inwardly and circularly thereof, and an intercepting grid mounted within the path of movement of said blades and held against movement in the direction of rotation of the blades, said grid extending diametrically of the container between opposite points in said path and terminating adjacent, but out of contact therewith and providing a multiplicity of openings therethrough for the passage of the material at each side of said axis.

13. In combination with a fixed cylindrical container having a refrigerated side wall, and a central longitudinal post stationarily mounted therein, a stirrer mounted to rotate about said post and having a pair of oppositely disposed blades extending obliquely to said wall, to propel material inwardly therefrom and circularly of the container, and an intercepting grid held against rotation on said post and extending transversely at each side thereof to points adjacent, but out of contact with the path of movement of said blades and longitudinally for the greater portion of their length and providing a multiplicity of openings for the passage of the material therethrough at each side of said post.

14. In combination with a fixed cylindrical container having a refrigerated side wall, and a central longitudinal post stationarily mounted therein, a stirrer mounted to rotate about said post and having a pair of oppositely disposed blades extending obliquely to said wall, to propel material inwardly therefrom and circularly of the container, and an intercepting grid held against rotation on said post and extending transversely at each side thereof, said grid being composed of a plurality of longitudinal bars spaced apart from each other and from said post and said path, to provide a multiplicity of openings for the passage of the material at each side of the post.

15. In combination with a fixed cylindrical container having a refrigerated side wall, and a central longitudinal post stationarily mounted therein, a stirrer mounted to rotate about said post and having a pair of oppositely disposed blades extending obliquely to said wall, to propel material inwardly therefrom and circularly of the container, and an intercepting grid held against rotation on said post and extending transversely at each side thereof, said grid being composed of a plurality of flat bars extending in parallelism with said post and spaced apart therefrom at each side thereof and spaced from each other and from said path, the flat sides of said bars forming the face sides of the grid and the spaces therebetween being of a width to permit free passage of the material therethrough.

ALBERT F. SAWYER.